Aug. 12, 1958     H. HOWE     2,847,639
AUTOMATIC VOLTAGE STABILISING DEVICES FOR A. C. CIRCUITS
Filed Sept. 7, 1954     3 Sheets-Sheet 1
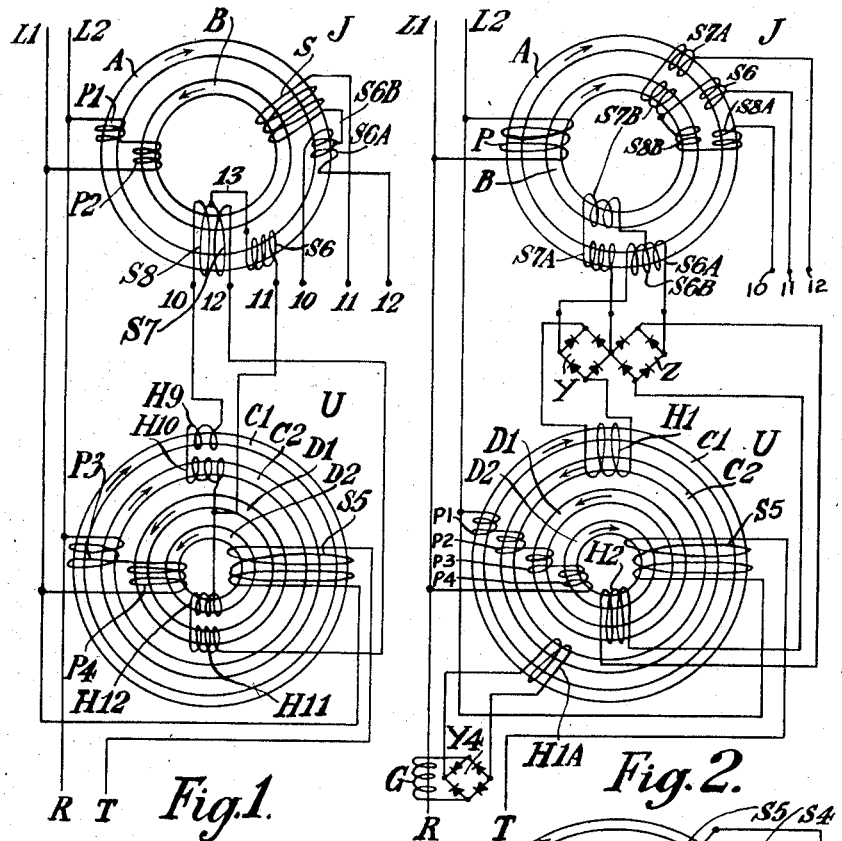
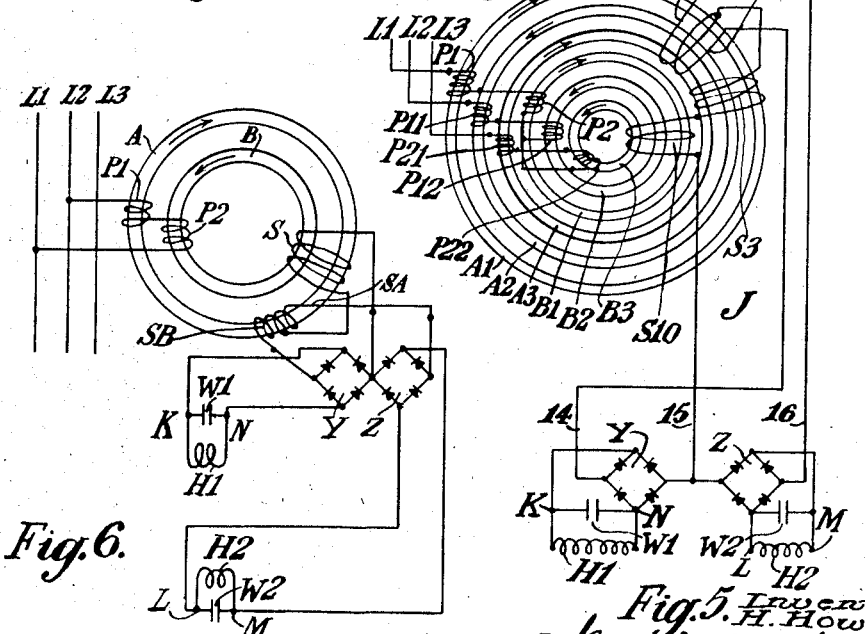

Aug. 12, 1958  H. HOWE  2,847,639
AUTOMATIC VOLTAGE STABILISING DEVICES FOR A. C. CIRCUITS
Filed Sept. 7, 1954  3 Sheets-Sheet 2

Inventor
H. Howe

Inventor
H. Howe

United States Patent Office 2,847,639
Patented Aug. 12, 1958

2,847,639

AUTOMATIC VOLTAGE STABILISING DEVICES FOR A. C. CIRCUITS

Harry Howe, Hale Barns, England

Application September 7, 1954, Serial No. 454,426

Claims priority, application Great Britain September 9, 1953

9 Claims. (Cl. 323—45)

The present invention relates to improvements in devices for providing automatic voltage stabilization of single or multi-phase A. C. circuits where the supply voltage and frequency are subject to variation above and below normal value and where the load is subject to variation between normal limits.

According to the present invention voltage stabilization is automatically effected by the provision of an inductive pilot control device which is adapted to provide two excitation supply voltages for producing excitation or satuation of two magnetic circuits of a reversible booster transformer unit or units and diversion of flux from one magnetic circuit to the other, the booster unit being energized by primary windings from the A. C. supply system and being provided with a secondary winding or windings connected between the supply system and the corresponding main or distribution circuit and in series therewith, through which a corrective boost voltage is introduced into the circuit under the influence of the pilot control device, of an amount equal to that of the supply voltage fluctuation which initiated it and appropriate in polarity and direction for restoring the voltage to normal value and providing automatic stabilization of the circuit voltage against supply voltages which fluctuate above and below normal value.

The pilot control device which may be employed singly or may comprise three units or their equivalent when applied to multi-phase supply systems comprises a pair of closed magnetic circuits or cores constructed of strip wound magnetic material or stacked laminations, the two circuits forming a pair being constructed of materials possessing dis-similar magnetic characteristics when jointly energized by identical windings in series or by a collective primary winding, the said magnetic circuits being suitably proportioned to provide equal fluxes when energized at normal voltage.

The pilot control device is provided with a main and an auxiliary secondary winding or group of windings, the main secondary winding or windings being adapted to provide a voltage representing the difference in the fluxes of the two circuits to which it is jointly associated, while the auxiliary secondary winding embraces only one circuit, preferably that subject to the least amount of flux variation. Either of the windings consists of two equal sections or in effect a double winding with a center tapping to which one end of the single winding is connected.

The voltage in the single secondary winding of the pilot device becomes directionally additive to that in one half of the tapped secondary winding and substractive in respect to that in the other half. When the supply voltage is normal the voltage provided by the single secondary winding is zero, since there is no difference of flux in the two magnetic circuits, and the two excitation voltages produced in the halves of the other secondary winding are equal and when connected to the two excitation windings of the booster units, do not produce any diversion of flux between the two circuits or sets of circuits in the magnetic system of the booster transformer unit become equal, and since the series winding on the booster unit is arranged to provide a voltage due to the difference of the fluxes in its two magnetic circuits or sets of magnetic circuits, no corrective voltage is introduced into the main circuit by the booster. If, however, the supply voltage varies from normal the pilot control device provides a voltage across the one secondary winding due to the difference in the fluxes of the two dis-similar magnetic circuits of which it is comprised, which voltage is combined with those in the halves of the other secondary winding to provide two excitation voltages which vary complementarily to each other as the supply voltage fluctuates, and cause a transference of flux between the two circuits or groups of circuits in the booster unit and automatically provide a corrective boost voltage in the main circuit in which the series winding of the booster transformer is included of a value equal to that of the variation in supply voltage which initiated it.

The pilot device may be arranged in various ways, for both single phase and multiphase operation, as exemplified by the constructions hereinafter more fully described. Similarly, numerous arrangements of the booster transformer unit are possible, some of which are hereinafter described in detail. The booster transformer unit embodies the principles of the inductive devices described in my co-pending Application No. 411,189, filed February 18, 1954.

As an alternative to the provision of an auxiliary secondary winding on the pilot control device this may be replaced by an independent or external source of supply, which may be either subject to or independent of supply voltage variation, provided such supply may be arranged with a center tapping if required.

Feed-back arrangements may be employed for providing compensation against voltage drop due to the effects of load in various ways. These are preferably provided on the booster transformer unit and may comprise a current transformer in one or more lines of the main circuit, the secondary output of the transformer being rectified and arranged to energize an additional excitation winding on the booster transformer unit which in effect increases the amount of the corrective boost voltage as the load increases.

The invention is more fully described with reference to the accompanying drawings, in which:

Figure 1 shows an arrangement according to the invention for operation on a single-phase circuit.

Figure 2 shows an alternative single phase arrangement.

Figure 5 shows a variation of the pilot control device only of the arrangement shown in Figure 4.

Figure 6 shows a combination of a pilot control device energized from one of the phases of a three-phase supply system together with a three-phase booster transformer unit.

Figure 3:
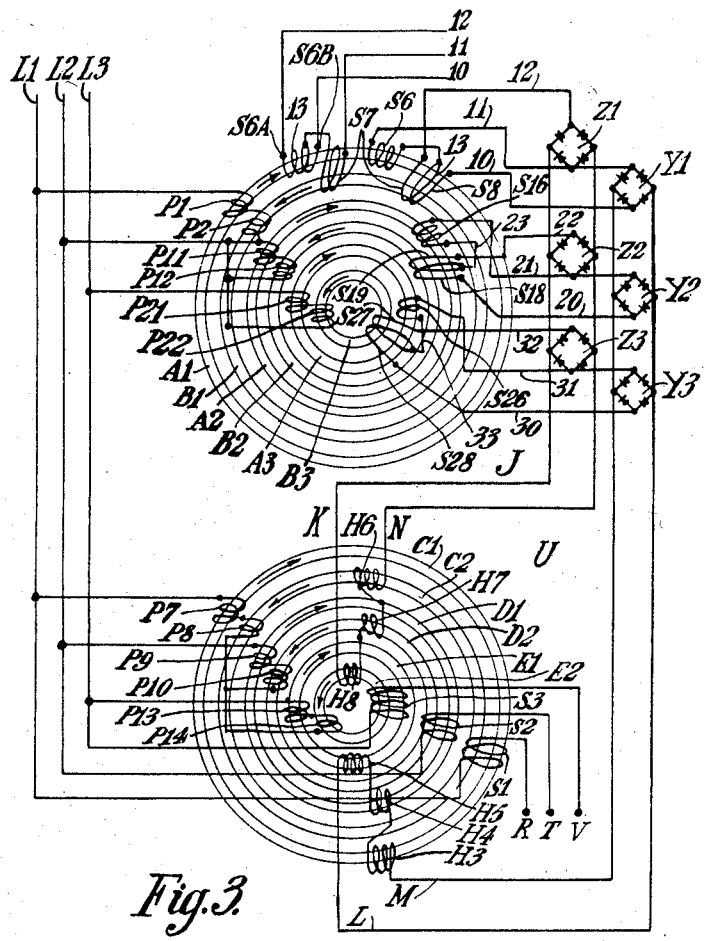
Figure 3 shows a three-phase arrangement in accordance with the invention.

Figure 1 shows a pilot control device J comprising two closed magnetic circuits or cores A and B consisting of rings made of spirally wound magnetic tape material or of stacked laminations. The two cores are made up from materials possessing dissimilar magnetic characteristics which produce relatively different inductions and magnetize at different rates when energized by the same magnetizing force. The cores are energized by identical individual primary windings P1 and P2 wound toroidally on them and connected in series across a single phase supply L1—L2 to produce magnetic fields in the two circuits in opposite directions as shown by the arrows. The two cores are preferably arranged to produce equal fluxes when the voltages are nomal which may involve providing unequal sectional areas depending upon the characteristics of the material used. Thus, if the induction in core B is less than that in core A at normal voltage it would be necessary to increase the sectional area of core B proportionately in order that the flux in the latter may be equal to that in core A. A main secondary winding having two equal sections S7—S8 embraces cores A and B and is provided with a center tapping while an auxiliary secondary winding S6 embraces core A only—the latter core being presumed to have the least amount of flux variation. The two secondary windings are connected to one another at the tapping leaving three free ends 10—11—12. The main secondary winding S7—S8 provides a voltage representing the difference between the two oppositely directioned fluxes in cores A and B. Thus, when the supply voltage is normal the voltage across the main secondary winding will be zero, while under conditions other than normal a voltage will appear across it proportional to the amount of deviation of the supply voltage from its normal or nominal value. If the supply voltage is below normal there will be a smaller amount of flux in core B than in core A, assuming that the rate of change of induction in core A is the smaller of the two, and the primary volts across the windings P1 and P2 which are equal when the supply volts are normal are now unequal with the same current passing through them since they are in series—the disparity between the two fluxes being indicated by the disparity in the respective voltages across the two primary windings. In these circumstances the direction of the predominating flux will be as indicated by the arrow on core A. If the supply voltage increases above normal then core B will contain the larger of the two fluxes and the balance of the two will be in the direction shown by the arrow on core B—thus the polarity of the main secondary winding is reversed when the supply voltage fluctuations are above normal in respect to what it is when the voltage fluctuations are below normal. The auxiliary secondary winding S6 always has an induced voltage across it which varies to a certain extent with the supply voltage but never changes its polarity. The voltage across the auxiliary secondary winding S6 is added to that across the S7 portion of the main secondary winding and is subtracted from that across the S8 portion when the supply voltage is less than normal and two excitation supply voltages are provided across connections 10—11 and 11—12, that across 10—11 being the greater of the two. As the voltage deviates further from normal the disparity between these two voltages increases proportionately to the deviation of the voltage from its normal value. If, however, the voltage rises above its normal value the voltage across the two portions S7 and S8 of the main secondary winding becomes reversed in polarity and the voltage across the auxiliary winding S6 is added to that across S8 and subtracted from that across S7—hence, the overall voltage across connections 10—11 is greater than that across connections 11—12 and the voltages will vary complementarily as the voltage deviation from normal increases. Under normal supply voltage conditions the voltages across connections 10—11 and 11—12 are both equal to the voltage across the auxiliary secondary winding S6.

The booster transformer unit U comprises two magnetic circuits each comprising two ring cores C1—C2 and D1—D2 respectively, each constructed of high permeability magnetic material in the form of spirally wound tape or stacked ring laminations. The cores are wound with diversionary excitation windings H9 on core C1, H10 on core C2, H11 on core D1 and H12 on core D2. The pair of cores C1—C2 are excited by a primary winding P3 wound toroidally while a primary winding P4 embraces the two cores D1—D2. The primary windings are connected in series across the single phase supply lines L1—L2 in such a manner as to produce fluxes in the cores C1 and C2 in one direction and in cores D1 and D2 in the opposite direction as shown by the arrows. A secondary winding S5 collectively embraces both pairs of cores and is connected between the supply line L1 and the output terminal T while supply line L2 is connected to the outer output terminal R. The excitation windings H9 and H10 on cores C1 and C2 are connected oppositely in series so as to mutually neutralize the inductive effects set up within them by the primary excitation. Excitation windings H11 and H12 on cores D1 and D2 are likewise oppositely connected in series.

The excitation windings H9—H10 receive their excitation supply from terminals 10—11 on the pilot control unit and the excitation windings H11—H12 receive their excitation supply from terminals 11—12. When the supply voltage is normal, the two groups of excitation windings H9—H10 and H11—H12 each receive equal excitation voltages and the fluxes in the cores C1—C2 are equal but opposite to those in the cores D1 and D2 and the voltages across the primary coils P3 and P4 will each be half of the line volts. The voltage across the secondary winding S5 is zero and thus there is no corrective voltage between the supply lines L1—L2 and the main circuit terminals R—T.

When the supply voltage falls below normal, the excitation voltage available across terminals 10—11 on the pilot device is greater than that across 11—12, hence the circuits C1—C2 receive more supplementary excitation, and the circuits D1—D2 receive less than normal. This causes a transference of flux to take place from the C1—C2 circuits to the D1—D2 circuits and due to the disparity of these fluxes a corrective boost voltage appears across the series secondary winding S5 of an amount equal to the deviation from normal supply voltage, which is added to the depleted line voltage from L1—L2 so that the main circuit voltage across terminals R—T will be restored to its normal value.

When the voltage rises above normal, there is a transference of flux from circuits D1—D2 to circuits C1—C2 and the direction of the predominating flux is opposite to what it was before, so that the corrective boost voltage across secondary voltage S5 is also opposite to what it was before and is subtracted from the increased line volts so as to restore the main circuit voltage across terminals R—T to its normal value.

An alternative secondary winding system is shown on the pilot control device where the auxiliary secondary winding S6A—S6B which embraces core A is the double or center tapped winding while the main secondary winding S collectively embracing the dissimilar cores A and B is the untapped winding. The two windings are interconnected in the manner already described and provide two excitation supply voltages across terminals 10—11 and 11—12 which operate precisely as before and in the manner already described. The latter arrangement is a preferred one, since the main secondary winding has a considerably greater number of turns than the auxiliary secondary winding and since the tapped winding is really a double winding it becomes more economical to duplicate the winding having the lesser number of turns.

In the present example the two excitation voltages produced by the pilot control device are passed along to the two excitation circuits of the booster transformer unit as an A. C. supply, but if desired they may be rectified before application to the booster unit. Either of these arrangements is satisfactory where the pilot control device and its associated booster transformer unit are both operating on a single phase supply or from any one phase of a three-phase supply. Where, however, the devices are particularly adapted for operation on three-phase supply systems involving different phase relationships the two excitation supply voltages should be passed along to the booster transformer unit in fully rectified form with smoothing arrangements if and where necessary.

Figure 2 shows a variation of the Figure 1 arrangement in which the pilot control device has the two dissimilar cores A and B energized by a single primary winding P in the same instead of opposite directions. This involves the use of a main secondary winding, half of which embraces each core as at S7A—S7B, while the auxiliary secondary winding embraces core A only as before, but comprises a center tapped winding having two sections S6A—S6B. The two portions of the main secondary winding S7A—S7B are connected oppositely in series so as to record a difference voltage due to the respective fluxes in the two cores A and B. The main and auxiliary windings are connected together at the tapping on the latter in the manner already described and provide two excitation supply voltages across connections 10—11, and 11—12 for the booster unit as before.

A further variation of the secondary winding system is shown in the illustration where the main secondary winding becomes the center tapped winding. This involves duplicating the main secondary windings S7A—S7B and S8A—S8B on the cores A and B. The two windings of a pair are oppositely connected while the two groups of windings are connected cumulatively in series. The auxiliary secondary winding S6 embraces core A only and is connected at the junction point between the two groups of main secondary windings. The three free ends of the group of windings provide two excitation supply voltages across connections 10—11 and 11—12 for the booster unit as before, and possessing the characteristics as described.

In Figure 2, the booster transformer unit has a primary winding P1—P2—P3—P4 on each of the cores C1—C2 and D1—D2 respectively, arranged to provide fluxes in mutually opposite directions in the cores C1—C2 as also in cores D1—D2, while the fluxes in the respective pairs of cores are opposite in direction to each other, as will be understood more clearly from the directional arrows on the individual cores in the illustration. Exciting windings H1 and H2 collectively embrace cores C1—C2 and D1—D2 respectively, and are arranged to receive an excitation supply voltage from the terminals 10—11 and 11—12 on the pilot control device either direct or through the rectifiers Y—Z as shown. A series secondary winding S5 collectively embraces the two pairs of cores C1—C2 and D1—D2 as before and is connected in series between the supply system and the main circuit terminals R—T at which point a stable supply voltage is maintained in the manner already described. The booster transformer unit embodies the principle described in my copending application No. 411,189, filed February 18, 1954, and differs from the Figure 1 arrangement in that the excitation winding H1 collectively embracing a pair of cores C1—C2 is non-inductive and is more suitable for D. C. or rectified A. C. operation where a large number of turns on the windings are involved. In Figure 1, the inductive voltages across the two excitation coils H9—H10 etc. are mutually neutral but may be individually high where D. C. windings having a large number of turns are employed.

Compensation for internal voltage drop within the equipment—due to load—may be provided by the application of feed-back principles in a number of ways, one being shown in Figure 2 where current transformer G is included in one of the main circuit leads where its secondary output current—which is proportional to the load current—is connected through a rectifier Y4 to an auxiliary excitation winding H1A collectively embracing cores C1—C2 on the booster units, which additional excitation effects a greater transference of flux and produces an increased corrective boost voltage in the main circuit as the load is increased of a sufficient value to balance the voltage drop occasioned by the effect of load fluctuation.

The arrangement shown in Figures 1 and 2 may be adapted to operate on a three-phase supply system by providing three identical pilot control devices and three identical booster transformer units which may be grouped together in star or delta combinations.

Figure 3 shows a combination of pilot control device J and booster transformer unit U particularly adapted for three-phase operation in simpler form. In the example shown, the pilot control device J comprises in effect three units similar to those shown in Figure 1, the dissimilar cores A1—B1 comprising the equivalent of one unit energized from supply lines L1—L2 by primary windings P1—P2 connected in series to provide oppositely directional fluxes in the cores A1—B1. A main secondary winding of two sections S7—S8 center tapped embraces the pair of cores A1—B1 while an auxiliary secondary winding S6 embraces core A1 only as before. The two windings are interconnected in the manner already described and provide two excitation voltages across connections 10—11 and 11—12 which have the same characteristics as those already described. In like manner two other pairs of cores A2—B2 and A3—B3 are provided with similar primary windings P11—P12 and P21—P22 energized from supply lines L2—L3 and L3—L1 respectively. Main and auxiliary secondary windings are arranged similar to those on the first mentioned pair of cores and provide in each case two excitation supply voltages across connections 20—21 and 21—22, also 30—31 and 31—32 respectively. Full wave rectifiers Z1—Z2—Z3 are connected across leads 11—12, 21—22, and 31—32, and the three rectifiers are parallel connected on their output side in a group providing a rectified excitation voltage at terminals K—N on the booster unit U. In like manner rectifiers Y1—Y2—Y3 are connected across leads 10—11, 20—21, and 30—31 respectively, and are parallel connected on their output sides in a group and provide a second rectified excitation supply voltage at terminals L—M— these two excitation supply voltages being available for the booster unit U. The booster transformer unit employed in this instance is of simplified form and comprises three pairs of closed magnetic circuits C1—C2, D1—D2 and E1—E2 each in the form of a ring or spirally wound core or stacked laminated magnetic material preferably of the high permeability type. Each pair of cores C1—C2, D1—D2 and E1—E2 is energized by two primary windings P7—P8, P9—P10, P13—P14, connected in series and star connected to supply lines L1, L2 and L3, although they could equally well be connected in delta if desired. The two cores forming a pair are energized in opposite directions from each phase, as shown by the arrows. Secondary windings S1, S2 and S3 each collectively embrace a pair of cores C1—C2, D1—D2 and E1—E2. Each of the three secondary windings acquires a voltage representing the difference of flux in the two cores they embrace and the windings are connected between the supply lines L1—L2—L3 and the main circuit terminals R—T—V respectively, so as to introduce the necessary corrective voltage into the system to maintain a stabilized voltage at the terminals R—T—V.

The points K—N and L—M are respectively connected to the excitation windings H6—H7—H8 embracing circuits C2—D2—E2 and the excitation windings H3—H4 and H5 embracing circuits C1—D1—E1. The three excitation windings in each case are connected in series and due to their respective phase relationships are vectorially neutral and each group is therefore non-inductive overall.

If the supply voltage varies from normal, the excitation supply voltages across K—N and L—M become unequal and a transference of flux would be effected in the booster transformer unit U between the circuits C2—D2—E2 and C1—D1—E1, and three corrective secondary voltages are developed in the windings S1—S2—S3.

A variation of the secondary winding system is shown in the illustration on rings A1—B1 where the auxiliary secondary winding S6 becomes a center tapped one while the winding S7—S8 becomes the untapped one. This involves duplicating the S6 winding into two parts S6A and S6B which are cumulatively in series to provide a center tapping to which the main secondary winding S7 collectively embracing the cores A1—B1 is connected, thus providing two excitation voltages across the three open connections 10—11 and 11—12 in similar manner to the arrangements already explained.

Figures 4, 8:
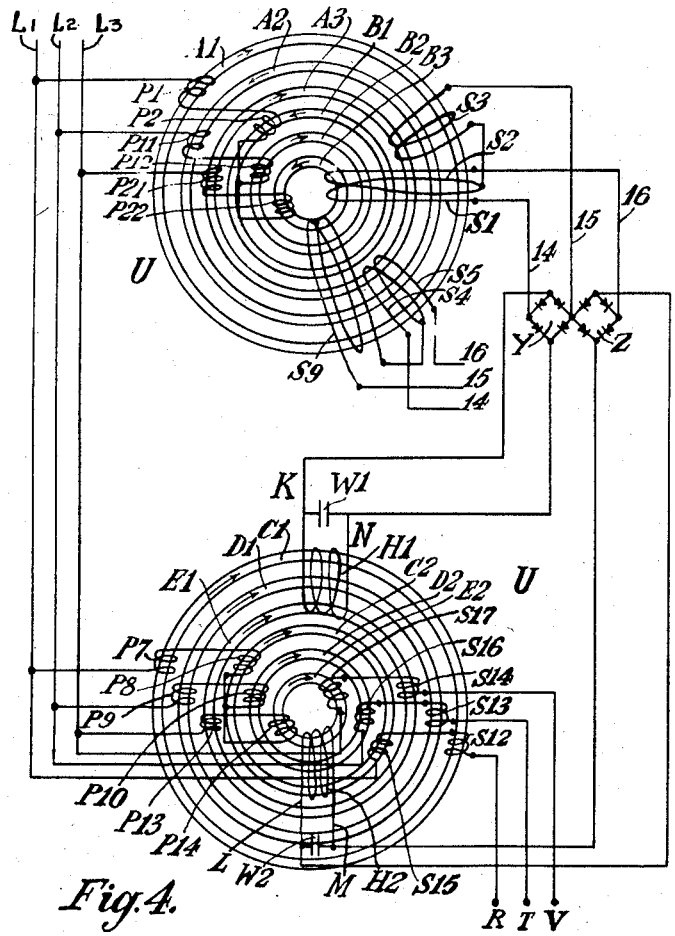
Figure 4 shows another three phase arrangement.
Figure 8 shows one method of arranging the windings of the latter arrangement as a pilot control unit.

Figure 4 shows an arrangement in which the monitor unit J comprises three pairs of dis-similar closed magnetic circuits A1—B1, A2—B2, and A3—B3 energized by primary windings P1—P2, P11—P12 and P21—P22 respectively, each pair being connected in series and star connected to the three-phase supply source L1—L2—L3. The ring circuits constituting a pair are magnetized in opposite directions as shown by the arrows. One of the pairs A2—B2 in the example shown is oppositely connected relatively to the other two pairs of circuits so that by this reversal of phase relationship in one of the pairs of circuits the magnetizing forces in the three pairs of circuits become 60° apart instead of 120°. The orientation of the ring circuits is such that the circuits A1—A2—A3 are grouped together, while the circuits B1—B2—B3 form another group. Each group, due to the 60° phase relationships of the circuits comprising it, produces an additive magnetic flux overall. The two groups are, however, energized in opposite directions and a main center tapped secondary winding of two sections S1—S2 is provided embracing all the six circuits. This winding has no induced voltage across it under normal voltage conditions since the total fluxes due to the circuits A1—A2—A3 are equal and opposite to those produced by the circuits B1—B2—B3.

If the supply voltage increases above normal the group of circuits B1—B2—B3 produce more flux than the group A1—A2—A3 and an induced voltage appears across the main secondary windings S1—S2 of a certain polarity, while if the supply voltage falls below normal the flux produced by the group of circuits B1—B2—B3 is less than that produced by the group A1—A2—A3 and an induced voltage of opposite polarity appears across the main secondary windings S1—S2.

An auxiliary secondary winding S3 collectively embraces the group of circuits A1—A2—A3, these being the ones which have the least change of magnetization with change of voltage. This winding is connected to the center tapping of winding S1—S2 so that its voltage is added to that of S1 and subtracted from that S2 thereby creating two excitation voltages cross the terminals 14—15, and 15—16 respectively, which vary complementarily in values with a fluctuation in supply voltage. The excitation voltages are applied to the excitation windings H1 and H2 of the booster transformer unit U through suitable rectifiers Y and Z and terminals K—N and L—M respectively. Smoothing condensers W1—W2 are connected in parallel with the excitation windings H1 and H2 in view of the excitation being provided from single phase sources.

A variation of this arrangement is shown in the diagram of the pilot control device in which the main secondary winding embracing all the six circuits is a single instead of a double or center tapped one while the auxiliary secondary winding S4—S5 embracing circuits A1—A2—A3 is the double or center tapped one connected as shown and provides two excitation supply voltages across terminals 14—15 and 15—16 with the same results as in the arrangement already described.

The booster transformer unit U comprises three pairs of closed magnetic circuits as shown, rings C1 and C2 constituting a pair being energized by primary windings P7—P8, rings D1—D2 being similarly energized by primary windings P9—P10, and rings E1—E2 being energized by primary windings P13—P14 connected individually in series to produce fluxes in the directions as shown by the arrows. The pairs of primary windings are shown star connected and energized from three-phase supply lines L1—L2—L3. Secondary windings S12 and S15 are connected oppositely in series between line L1 and terminal R, as are also secondary windings S13 and S16 between line L2 and terminal T, and windings S14 and S17 between line L3 and terminal V. The induced voltages across each secondary winding of a pair are equal and opposite under normal voltage conditions but unequal when the voltage is other than normal. The windings having the greater of the two potentials when the supply voltage is above normal have the lesser voltage when the voltage is below normal and vice versa, and hence the polarity of the corrective boost voltage is automatically determined as already described, and a stabilized three-phase supply voltage is available across terminals R—T—V.

Figure 5 shows a further form of pilot control device which differs from that of Figure 4 in that the primary windings P1—P11—P21, and P2—P12—P22 energize the circuits A1—A2—A3 and B1—B2—B3 for 60° phase displacement, but the circuits B1—B2—B3 are energized in the same directions as the circuits A1—A2—A3 instead of in opposite directions as shown in Figure 4. The main secondary winding comprises two separate sections S3 and S10 collectively embracing the group of circuits A1—A2—A3 and the group B1—B2—B3 respectively and connected oppositely in series. Each of these windings has an equal voltage induced in it under normal supply voltage conditions and as a result produces an overall zero voltage. On a fluctuation of supply voltage the induced voltage increases in one winding and decreases in the other providing a difference voltage overall, the disparity of which is a function of the amount of supply voltage change. As to which of the two voltages is the higher depends on whether the supply voltage is higher or lower than normal. A double or center tapped auxiliary secondary winding S4—S5 is arranged to embrace the group of circuits A1—A2—A3 in the manner previously described, to the center point of which the main secondary windings S3 and S10 are connected providing two excitation supply voltages across terminals 14—15 and 15—16 which are connected to the excitation windings of the booster unit U as shown in Figure 4.

Figure 6 shows a pilot control device similar to that shown in Figure 1 which is arranged to operate from one of the phases only of the three-phase supply system and provides two excitation supply voltages across connections 10—11 and 11—12 which, after suitable rectification by rectifiers Y and Z, are passed along to the excitation windings H1 and H2 on the booster unit U, the booster transformer arrangement being otherwise as shown and described in connection with Figure 4 and differing from that arrangement only in that the rectified single phase excitation is obtained from one phase of the three-phase supply system, whereas in the Figure 4 arrangement it is derived from all the phases of the supply system as an average of them all. Smoothing condensers W1 and W2 will also be required to bridge the windings H1 and H2 as in the Figure 4 arrangement.

Figure 7:
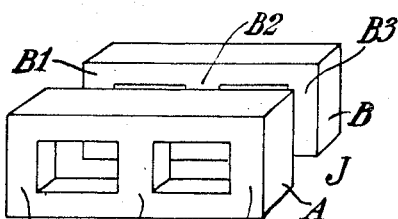
Figure 7 shows the two three-limb cores of the shell type for the pilot control unit as an alternative to the ring type core arrangement.

Figure 7 shows an alternative construction of pilot control device J comprising two three-limb shell type cores A and B constructed of dissimilar magnetic materials possessing characteristics as already described. The arrangement of windings is shown more clearly in section in Figure 8, where the corresponding limbs A1—A2—A3 and B1—B2—B3 are shown together with their respective directions of magnetization to be equivalent to the Figure 3 arrangement.

Referring to Figure 8, primary windings P1—P2, P11—P12 and P21—P22 are arranged to embrace the limbs A1—B1, A2—B2 and A3—B3 respectively. The respective pairs of windings are connected in series but arranged to magnetize the limbs of one core oppositely to those of the other core, the groups of windings being star connected across the three-phase supply lines L1—L2—L3. Center tapped auxiliary secondary windings S6A—S6B, S16A—S16B, and S26A—S26B individually embrace the limbs A1—A2—A3 respectively, while the main secondary windings S7—S17—S27 collectively embrace limbs A1—B1, A2—B2, and A3—B3 respectively—the main secondary windings being connected to the centertapped auxiliary secondary windings in the manner already described, the combined windings producing two excitation voltages across connections 10—11—12, 20—21—22, and 30—31—32 from the three sets of windings respectively. These are connected through rectifiers Y1—Z1, Y2—Z2 and Y3—Z3 the output side of the rectifiers being parallel connected in two groups, as shown, to the booster excitation windings H1—H2 through terminals K—N and L—M in precisely the same manner as in Figure 3, the operation being as described with reference to Figure 3.

The auxiliary secondary windings provided on the various arrangements of pilot control device are mainly intended to establish a reference voltage and may be substituted by an independent or external A. C. source of supply where a center tapping is or can be made available—such supply being either subject to or independent of supply voltage fluctuation.

Any of the pilot control device arrangements shown may be used in combination with any of the booster transformer arrangements shown here and also to such details as are shown and described in my co-pending application No. 411,189, filed February 18, 1954 as regards their application to single or three-phase operation.

What I claim is:

1. An A. C. voltage stabilizing system, comprising a pilot transformer having for each phase, two closed core elements made of materials of dissimilar magnetic characteristics, at least one primary winding for energizing the core elements, secondary windings linked respectively with one and with two core elements per phase, and adapted to yield two output voltages which are equal only when the input voltage is at its normal value; and a booster unit having at least two pairs of closed core elements, a primary winding in each phase for energizing the core elements, two exciting windings each associated with at least one core element per phase and arranged non-inductively with respect to the primary windings and each receiving one of the secondary voltages from the pilot transformer, and at least one secondary winding per phase connected between the supply system and the distribution circuit to supply a corrective voltage when necessary.

2. A system as claimed in claim 1, having a pilot transformer primary winding in equal sections oppositely disposed one on each core element, a pilot transformer secondary winding on one core element, a pilot transformer secondary winding embracing both core elements, one end of one secondary winding being connected to the center of the other secondary winding, and output terminals connected respectively to the other end of the one secondary winding and to the two ends of the center-tapped secondary winding.

3. A system as claimed in claim 1, having a pilot transformer primary winding embracing both core elements, a pilot transformer secondary winding on one core element, a pilot transformer secondary winding having equal sections oppositely disposed on the two core elements, one end of one secondary winding being connected to the center of the other secondary winding, and output terminals connected respectively to the other end of the one secondary winding and to the two ends of the center tapped secondary winding.

4. A system is claimed in claim 1, and having rectifying means connected between the pilot transformer secondary windings and the booster unit exciting windings.

5. A system as claimed in claim 1, comprising a pilot transformer having three pairs of core elements, and primary windings associated with each pair of core elements and connected to separate phases of a three-phase supply; and a booster unit having three pairs of core elements and primary windings associated with each pair of core elements and connected to separate phases of the supply.

6. A system as claimed in claim 1, in which the pilot transformer has three pairs of core elements, three primary windings for connection to separate phases of a three-phase supply, each in equal sections oppositely disposed one on each core element of a pair, and three pairs of secondary windings each linked respectively with one and with both core elements of a pair, three pairs of rectifiers each associated with one pair of secondary windings to rectify the voltages therefrom and conductors connecting one rectifier of each pair in parallel to one exciting winding and the other rectifier of each pair in parallel to the other exciting winding.

7. A system as claimed in claim 1, in which the pilot transformer has three pairs of core elements, three primary windings for connection to separate phases of a three phase supply each in equal sections oppositely disposed one on each core element of a pair, the winding sections on one pair of core elements being oppositely connected in relation to those on the other pairs, a secondary winding embracing three core elements, one from each pair, a secondary winding embracing all three pair of core elements, one end of one secondary winding being connected to the center of the other secondary winding, rectifiers connected between the other end of the one secondary winding and the two ends of the center-tapped secondary winding, and conductors connecting the outputs of the rectifiers to the exciting windings.

8. A system as claimed in claim 1, in which the pilot transformer has three pairs of core elements, three primary windings for connection to separate phases of a three phase supply, each in equal sections similarly disposed one on each core element of a pair, the winding sections on one pair of core elements being oppositely connected in relation to those on the other pairs, a center-tapped secondary winding embracing three core elements, one from each pair, a second secondary winding in two sections connected in series opposition, one section embracing three core elements, one from each pair and the other section embracing the other three core elements, one end of said second secondary winding being connected to the center of the first secondary winding, rectifiers connected between the other end of said second secondary winding and the two ends of the center-tapped secondary winding, and conductors connecting the outputs of the rectifiers to the exciting windings.

9. A system as claimed in claim 1, having a feed-back winding embracing a pair of core elements of the booster unit, a current transformer in one of the leads to the distribution circuit, and a rectifier connected between the current transformer output and the feed-back winding, whereby the excitation of the said pair of core elements is increased and the corrective voltage from the booster unit is increased to compensate for voltage drop due to load fluctuation.

References Cited in the file of this patent

UNITED STATES PATENTS

| | | |
|---|---|---|
| 2,351,980 | Lee | June 20, 1944 |
| 2,547,615 | Bedford | Apr. 3, 1951 |